United States Patent [19]
Pan et al.

[11] Patent Number: 5,967,163
[45] Date of Patent: Oct. 19, 1999

[54] ACTUATOR AND METHOD

[75] Inventors: Jeffrey Y. Pan, Lake Forest, Ill.; Mehran Magregany, Pepper Pike, Ohio

[73] Assignee: Abbott Laboratories, Abbott Park, Ill.

[21] Appl. No.: 08/594,023

[22] Filed: Jan. 30, 1996

[51] Int. Cl.$^6$ .................................................. F16K 31/02
[52] U.S. Cl. ........................ 137/1; 251/14; 251/129.03; 251/129.06
[58] Field of Search ............................ 251/129.06, 61.1, 251/61.2, 14, 129.03, 129.02; 137/1

[56] References Cited

U.S. PATENT DOCUMENTS

| | | |
|---|---|---|
| 3,083,943 | 4/1963 | Stewart, Jr. et al. . |
| 3,286,977 | 11/1966 | Miottel . |
| 3,312,238 | 4/1967 | Voit, Jr. . |
| 3,477,693 | 11/1969 | Bezamos . |
| 3,600,953 | 8/1971 | Isreeli et al. . |
| 3,749,353 | 7/1973 | Pauliukonis . |

(List continued on next page.)

FOREIGN PATENT DOCUMENTS

| | | |
|---|---|---|
| 0250948 | 11/1988 | European Pat. Off. . |
| 0339528 | 11/1989 | European Pat. Off. . |
| 420296A | 3/1991 | European Pat. Off. . |
| 562694A | 9/1993 | European Pat. Off. . |
| 2155152 | 9/1985 | United Kingdom . |

OTHER PUBLICATIONS

International Search Report corresponding to PCT/US97/01329.
A Pneumatically Actuated Micro Valve With A Silicone Rubber Membrane For Integration With Fluid–Handling Systems *Transducer '95 Eurosensors IX.*
A Silicone Microvalve with Combined Electromagnetic/Electrostatic Actuation *Sensors and Actuators A*, 37–38 (1993) 684–692.
A Bistable Pneumatic Microswitch for Driving Fluidic Components *Transducers '95 Eurosensors IX.*
Huff, Michael A. et al., "A Threshold Pressure Switch Utilizing Plastic Deformation of Silicon" IEEE 91CH2817–5/91/0000–0177, 1991, pp. 177–180.
Huff, Michael A. et al., "A Pressure–Balanced Electrostatically–Actuated Microvalve" IEEE Solid–State Sensor and Actuator Workshop, Technical Digest, Hilton Head, S.C. , Jun. 4–7, 1990, pp. 123–127.
T. Ohnstein, T. et al. "Micromachined Silicon Microvalve" IEEE Micro Electro Mechanical Systems, Napa Valley, CA, Feb. 11–14, 1990, pp. 95–98.
Bakable Silicon Pneumatic Microvalve *Transducers '95 Eurosensors IX.*
Branebjerg, Jens and Peter Gravesen. "A New Electrostatic Actuator providing improved Stroke length and Force". IEEE Micro Electro Mechanical Systems '92 Travelmunde, Germany, Feb. 4–7, 1992, pp. 6–11.
Jensen, D.F. Pneumatic Digital Control of a Synchronous Device:. Fluidics Quarterly, vol. 1 No. 1, 1967, pp. 27–37.
Manning, J.R. Fluidics Control Devices and Systems:. Fluidics Quarterly, ca. 1970.

*Primary Examiner*—Kevin Lee
*Attorney, Agent, or Firm*—Mark C. Bach

[57] ABSTRACT

An actuator and a method of controlling the actuator are disclosed. In one embodiment, the actuator is a valve comprising a first port and a second port fluidly connected with the first port such that fluid communicates between the first port and the second port. A flexible member is operatively connected with the first port and the second port. The flexible member is movable between a first position permitting fluid communication between the first port and the second port and a second position reducing fluid communication between the first port and the second port. A first controller is operatively connected with the flexible member for moving the flexible member between the first position and the second position. A second controller is operatively connected with the flexible member for retaining the flexible member in the second position.

5 Claims, 12 Drawing Sheets

U.S. PATENT DOCUMENTS

| | | |
|---|---|---|
| 3,934,611 | 1/1976 | Gachot et al. . |
| 4,070,004 | 1/1978 | Friswell . |
| 4,119,120 | 10/1978 | Mehaffy et al. . |
| 4,168,724 | 9/1979 | Graffunder et al. . |
| 4,239,494 | 12/1980 | Clements . |
| 4,259,291 | 3/1981 | Smythe . |
| 4,304,257 | 12/1981 | Webster . |
| 4,353,243 | 10/1982 | Martin . |
| 4,399,362 | 8/1983 | Cormier et al. . |
| 4,479,762 | 10/1984 | Bilstad et al. . |
| 4,517,302 | 5/1985 | Saros . |
| 4,581,624 | 4/1986 | O'Connor ..................... 251/129.06 X |
| 4,601,881 | 7/1986 | Webster . |
| 4,703,913 | 11/1987 | Hunkapiller . |
| 4,721,133 | 1/1988 | Sundblom . |
| 4,848,722 | 7/1989 | Webster . |
| 4,852,851 | 8/1989 | Webster . |
| 4,853,336 | 8/1989 | Saros et al. . |
| 4,858,833 | 8/1989 | Webster . |
| 4,858,883 | 8/1989 | Webster ................... 251/61.1 |
| 5,029,805 | 7/1991 | Albarda et al. ................. 251/129.06 X |
| 5,045,473 | 9/1991 | Cassaday et al. . |
| 5,149,658 | 9/1992 | Cassaday . |
| 5,203,368 | 4/1993 | Barstow et al. . |
| 5,238,223 | 8/1993 | Mettner et al. ................ 251/129.06 X |
| 5,391,353 | 2/1995 | Graffunder . |
| 5,452,878 | 9/1995 | Gravesen et al. ................... 251/331 X |

ACTUATOR AND METHOD

BACKGROUND OF INVENTION

Embodiments described herein relate to a device having a control and a method of controlling the device. More specifically, the embodiments relate to a valve control and a method of controlling the valve.

Controllers and methods of controlling are used in many applications, Given the different applications, there is a need for different controllers and methods of controlling suited for a particular application. For instance, instead of having one controller for one device, it may be desirable to have one controller for a number of devices. Alternatively, for performance reasons and the like, multiple controllers may be linked to one device. Also, it may be a concern to have a controller that takes up as little space as possible.

SUMMARY OF INVENTION

In one embodiment, an actuator in the form of a valve comprises a first port and a second port fluidly connected with the first port such that fluid communicates between the first port and the second port. A flexible member is operatively connected with the first port and the second port. The flexible member is movable between a first position permitting fluid communication between the first port and the second port and a second position reducing fluid communication between the first port and the second port. A first controller is operatively connected with the flexible member for moving the flexible member between the first position and the second position. A second controller is operatively connected with the flexible member for retaining the flexible member in the second position.

According to another embodiment, a method of controlling an actuator in the form of a valve having a flexible member movable between a first position where the flexible member allows fluid communication between a first port and a second port and a second position where the flexible member reduces fluid communication between the first port and the second port is provided. The method includes moving the flexible member toward the second position with a first force. The flexible member is retained in the second position with a second force. The second force is relieved to allow the flexible member to move toward the first position.

In still a further embodiment, an actuator is provided including a flexible member movable between a first position and a second position. A first controller is operatively connected with the flexible member for moving the flexible member between the first position and the second position. A second controller is operatively connected with the flexible member for retaining the flexible member in the second position.

In an additional embodiment, an actuator is provided movable between a first position and a second position. The actuator includes a first controller for moving the actuator between the first position and the second position, and a second controller for retaining the actuator in the second position.

DETAILED DESCRIPTION OF PREFERRED EMBODIMENTS

Embodiments described below relate of a device control and a method of controlling the device. The control and the method of controlling may be applied to any suitable device. Generally, the controller and the method utilize opposing forces to effect operation of the device. While particular embodiments are described, it is to be noted that certain modifications can be made to the embodiments. For instance, although a particular order of method steps is disclosed, those method steps may be performed in any appropriate order. Also, steps from one method may be mixed with steps from another method to arrive at yet additional methods.

Figure 1:
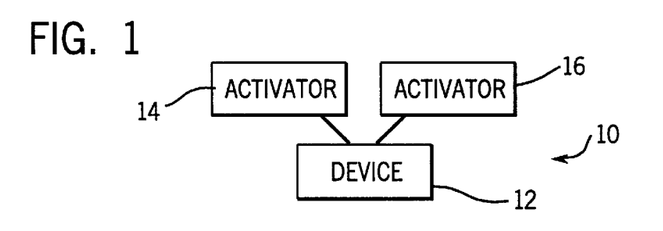
FIG. 1 is a block schematic diagram of an embodiment described herein.

An exemplary construction 10 of the embodiments, illustrated in FIG. 1, generally comprises a device 12, such as an actuator, a valve and the like, which is operated by a first controller 14 and a second controller 16, thus the first controller 14 and the second controller 16 are operatively connected with the device 12. The first and second controllers 14 and 16 may use different mechanisms of force generation to effect operation of the device 12. In one embodiment, the first controller 14 provides a first force which moves the device 12 between a first position and a second position and the second controller 16 provides a second force which maintains the device 12 in either the first position or the second position or both. In a specific embodiment, the first controller 14 is a source of pneumatic force while the second controller 16 is a source of electrostatic force. In another embodiment, the first controller 14 is an element providing a thermal force acting through a bi-morph or a shape memory alloy and the second controller 16 is an element providing an electrostatic force. In a further embodiment, the first controller 14 provides a hydraulic force and the second controller 16 provides an electrostatic force. In yet an additional embodiment, the first controller 14 provides a piezoelectric force while the second controller 16 provides an electrostatic force. Essentially, the first and second controllers 14 and 16 may provide any appropriate forces, such as pneumatic, fluidic, electrostatic, piezoelectric, thermal, elastic, electromagnetic, hydrostatic, etc., suitable to a particular application.

Figure 2:
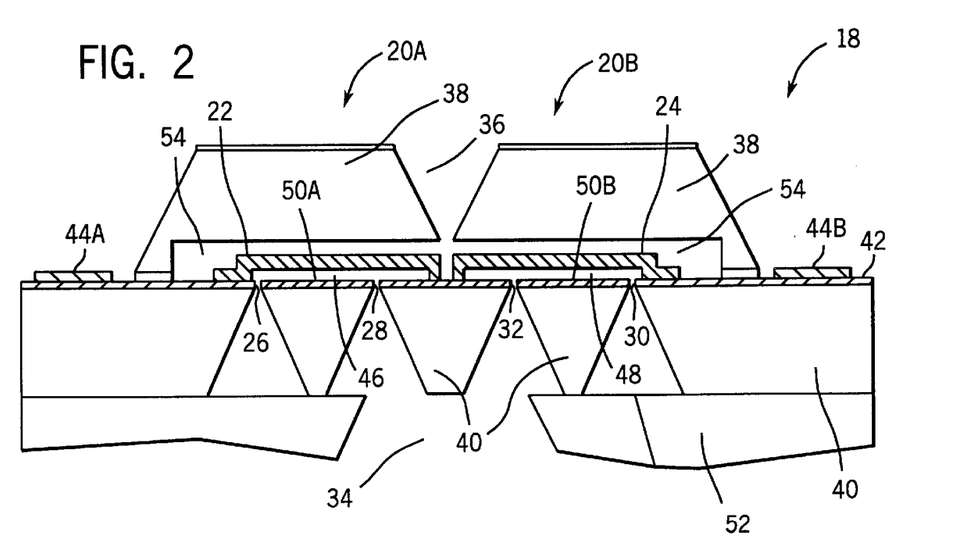
FIG. 2 is a sectional view of an application of the embodiment of FIG. 1.
Figure 3:
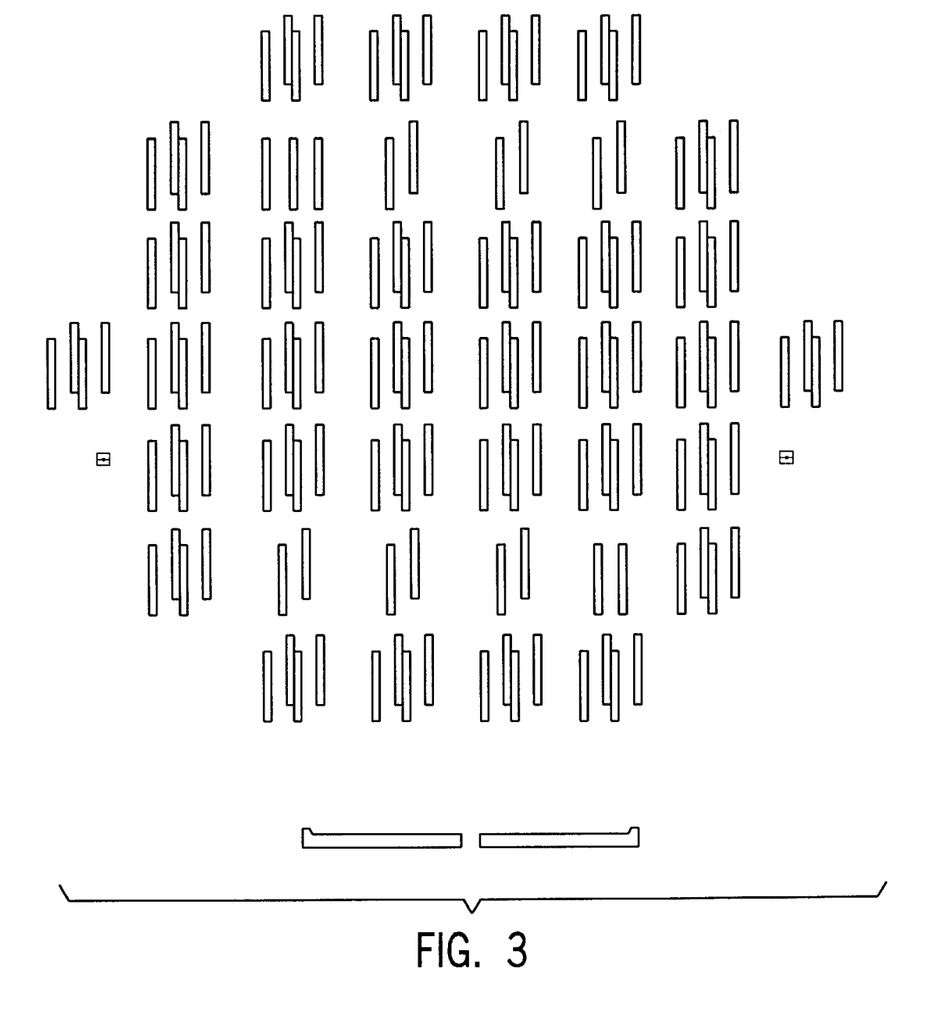
FIG. 3 represents a mask used for constructing the application of FIG. 2.
Figure 4:
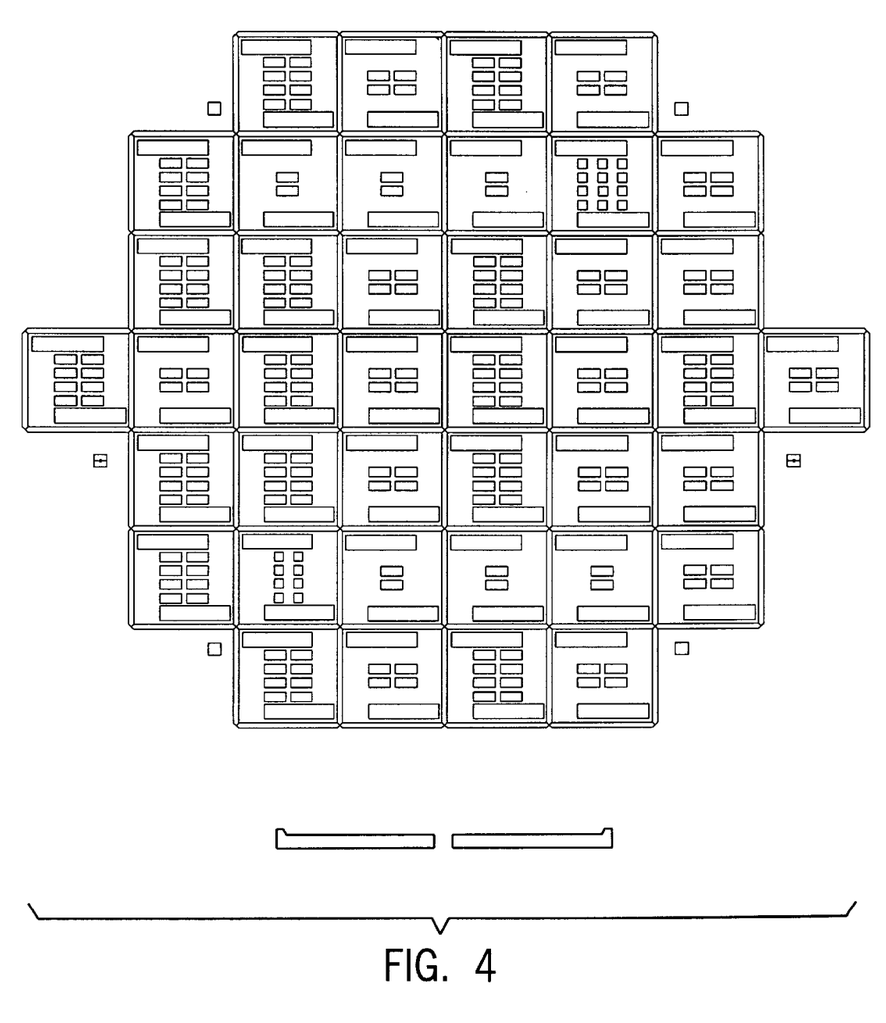
FIG. 4 represents a mask used for constructing the application of FIG. 2.

A particular embodiment is a valve assembly 18, illustrated in FIG. 2. While the illustrated valve assembly 18 consists of two valves 20A and 20B it is to be noted that the embodiment may be constructed with one or more valves as desired. The valve assembly 18 comprises at least a first flexible member or valve diaphragm 22 and a second flexible member or valve diaphragm 24, which are made of a flexible material. The first valve diaphragm 22 is operatively connected with a first or inlet port 26 and a second or outlet port 28. The second valve diaphragm 24 is operatively connected with a first or inlet port 30 and a second or outlet port 32. Functions of these ports 26, 28, 30 and 32 may vary. If desired, a common or separate supply conduits may be connected with the inlet ports 26 and 30. The first outlet port 28 and the second outlet port 32, in the illustrated construction, converge to a common outlet conduit 34. Alternatively, separate outlet conduits 34 may be provided.

Each valve 20A and 20B is operated by two controlling forces, one supplied by the first controller 14 and one supplied by the second controller 16, both of which are operatively connected with valve diaphragms. In exemplary embodiment, a controlling force supplied by the first controller 14 is pneumatic. In the illustrated embodiment, the first controlling force is delivered to the valves 20A and 20B through a fluid conveying conduit 36 through a housing 38. The fluid conveying conduit 36 conveys a pneumatic pressure to first sides of the first and second valve diaphragms 22 and 24.

In the illustrated embodiment, the controlling force supplied by the second controller 16 is electrostatic. This second controlling or electrostatic force is generated between either the first valve diaphragm 22 or the second valve diaphragm 24 or both and a ground plane 40 located adjacent the valve diaphragms 22 and 24. In this particular embodiment, the ground plane 40 comprises a piece of electrically conductive material, such as a wafer of silicon and the like. The ground plane 40 is separated from the valve diaphragms 22 and 24 by a layer 42 of electrically insulating material. A piece 44 of electrically conductive material is provided on a side of the layer 42 opposite to the ground plane 40. In the illustrated construction, there are two pieces or electrical contact pads 44A and 44B. The pieces 44A and 44B of electrically conductive material are electrically connected separately to the valve diaphragms 22 and 24, respectively. The electrostatic force is produced by applying an electrical potential between the ground plane 40 and the pieces 44A and 44B, and thus the valve diaphragms 22 and 24.

In this particular embodiment, the valve diaphragms 22 and 24 are made of an electrically conductive flexible material, such as polysilicon and the like. The valve diaphragms 22 and 24 are configured so that, with no external force applied, a fluid conveying conduit 46 is formed between the first inlet port 26 and the first outlet port 28 and a fluid conveying conduit 48 is formed between the second inlet port 30 and the second outlet port 32. The valve diaphragms 22 and 24 are also configured so that, when a pneumatic pressure greater than a pneumatic pressure present in the fluid conveying conduit 46 is applied to the conduit 36 facing side of the valve diaphragm 22, or, when a pneumatic pressure greater than a pneumatic pressure present in the fluid conveying conduit 48 is applied to the conduit 36 facing side of the valve diaphragm 24, the appropriate valve diaphragm 22 or 24 flexes or moves toward valve diaphragm engaging surfaces 50A or 50B, respectively, of the layer 42 to form an inhibiting barrier between the associated inlet and outlet ports. The valve diaphragms 22 and 24 and ground plane 40 are constructed so that, when either of the valve diaphragms 22 or 24 is sufficiently adjacent to the valve diaphragm engaging surfaces 50A and 50B, an electrical potential may be applied between the valve diaphragm 22 or 24 and the ground plane 40 so that, even when a negative or reduced pneumatic pressure is applied to the conduit 36 facing sides of the valve diaphragms 22 or 24, the valve diaphragm 22 and/or 24 is maintained in its position adjacent the valve diaphragm engaging surfaces 50A and 50B by the electrostatic force between the valve diaphragm 22 or 24 and the ground plane 40.

To further clarify the valve assembly 18, one method of constructing the valve assembly 18 is discussed. According to this method, the valve assembly 18 is fabricated from three silicon wafers each having a thickness of about 400 $\mu$m. The three wafers form the housing 38, the ground plane 40, and a base layer 52. Fabrication comprises a sequence of manufacturing steps using masks represented in FIGS. 3 through 9.

Figure 10A:
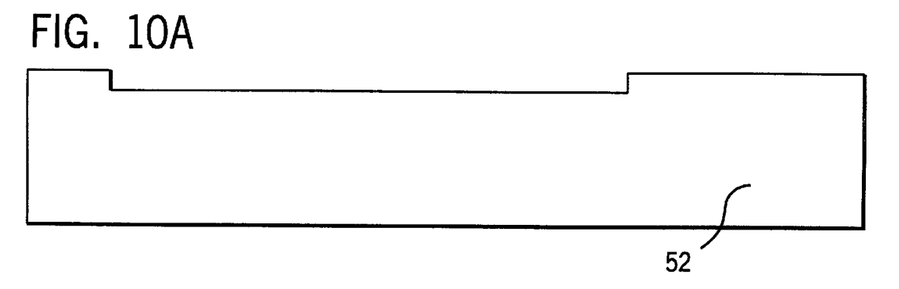
FIGS. 10A through 10C illustrate construction of the application of FIG. 2.
Figure 10B:
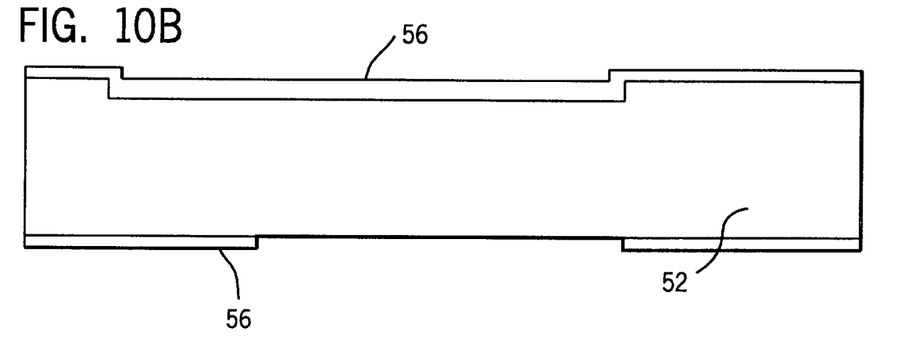
Figure 10C:
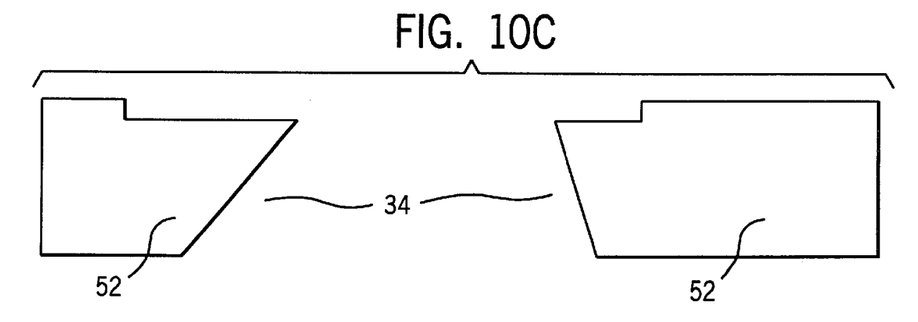

The base layer 52 is fabricated from a <100> silicon wafer having a thickness of about 400 $\mu$m with allowable thickness variation of up to about 25 $\mu$m. Flow channels (about 10–20 $\mu$m deep) that connect to the inlet ports 26 and 30 are patterned with mask 1 (FIG. 3) and etched into the base layer 52 using plasma and a photoresist etch mask as shown in FIG. 10A. The base layer 52 is oxidized to create an oxide thickness 56 of about 1 $\mu$m. The oxide thickness 56 is patterned with mask 2 (FIG. 4) on the base layer 52 to open windows for etching through holes that form the outlet conduit 34 (FIG. 10B). The base layer 52 is then etched in KOH to create through holes, and the oxide thickness 56 is removed from the surface of the base layer 52 by HF (FIG. 10C).

Figure 5:
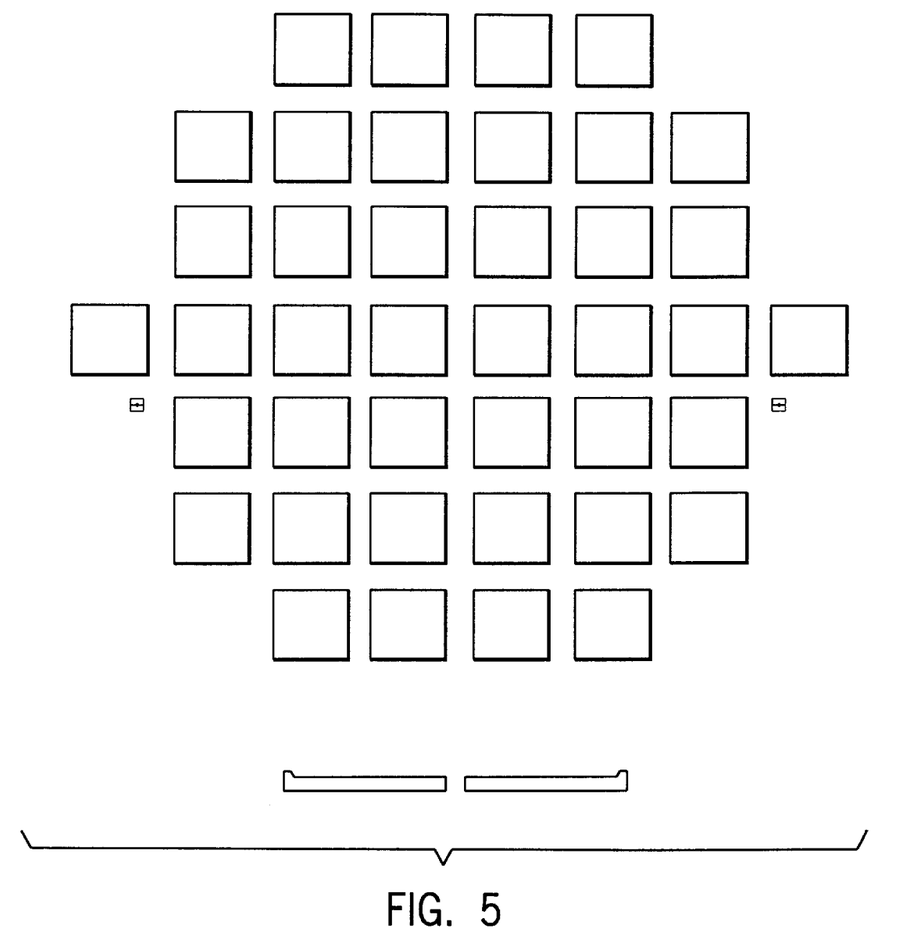
FIG. 5 represents a mask used for constructing the application of FIG. 2.
Figure 6:
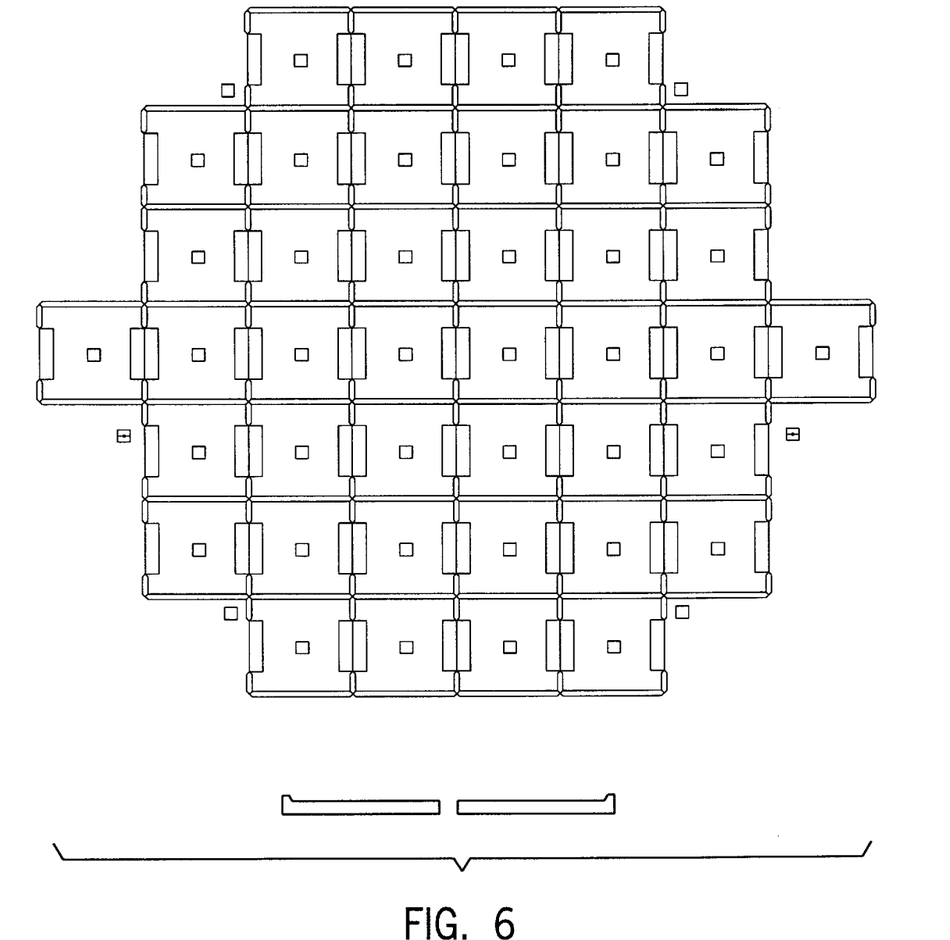
FIG. 6 represents a mask used for constructing the application of FIG. 2.
Figure 7:
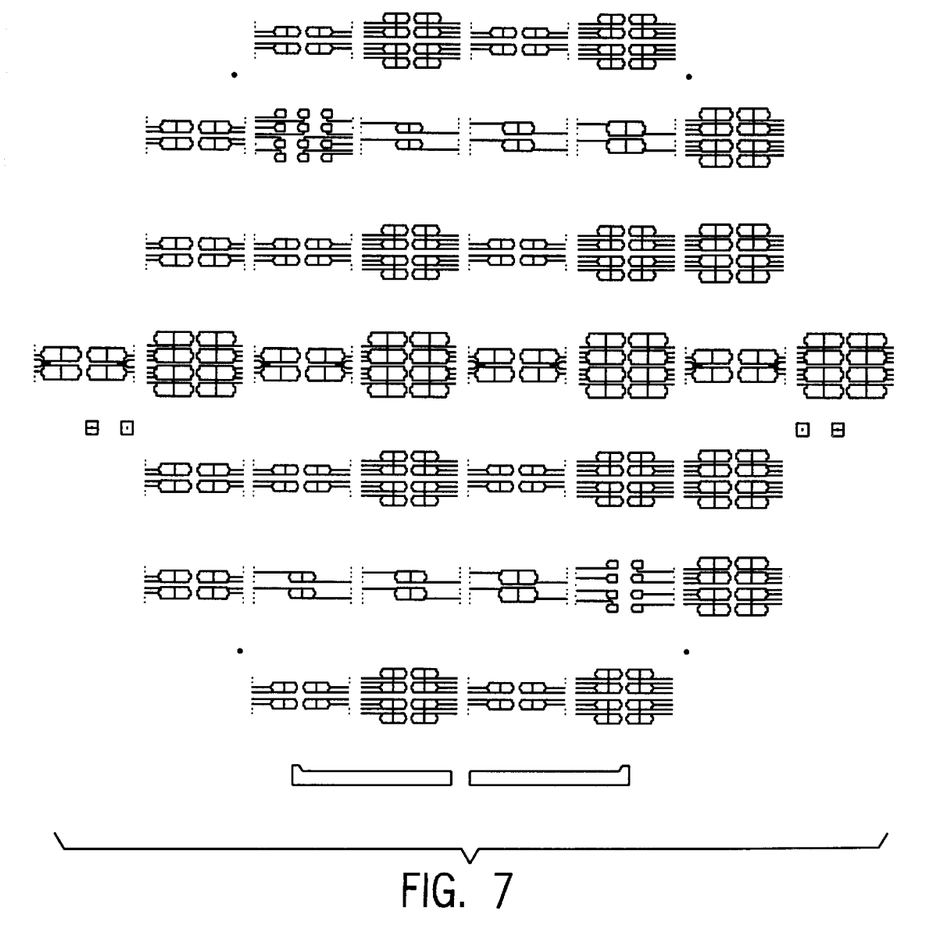
FIG. 7 represents a mask used for constructing the application of FIG. 2.
Figure 8:
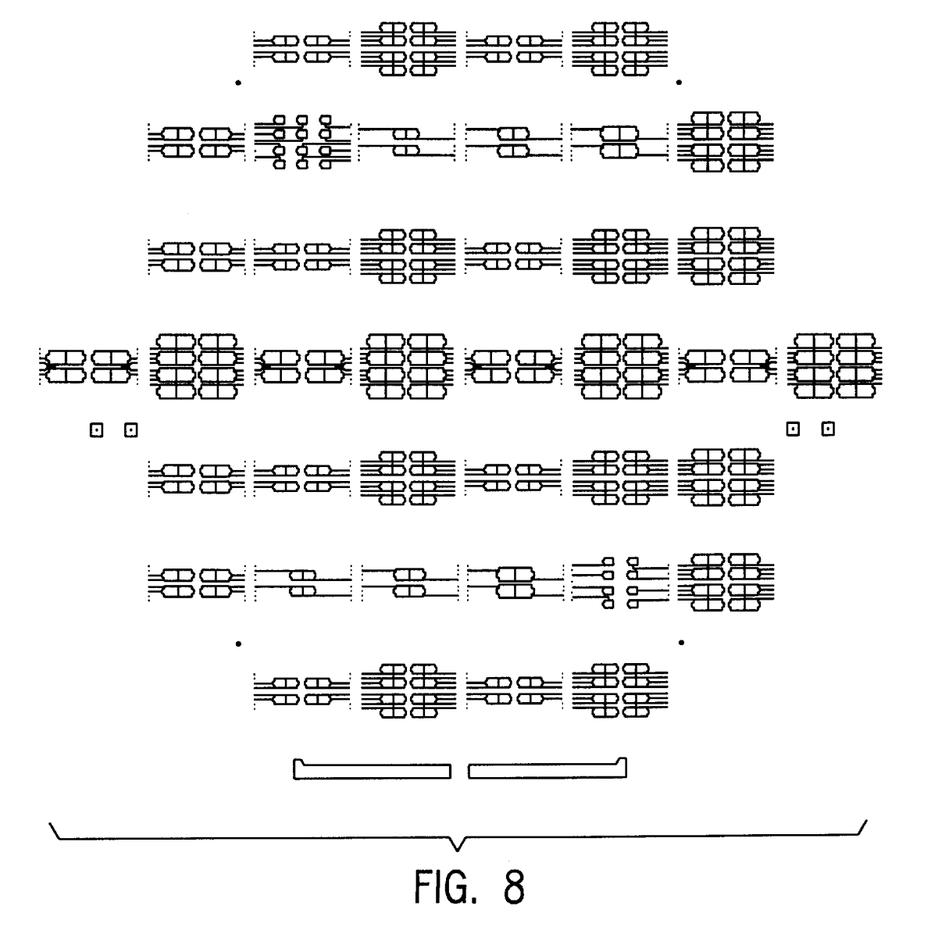
FIG. 8 represents a mask used for constructing the application of FIG. 2.
Figure 9:
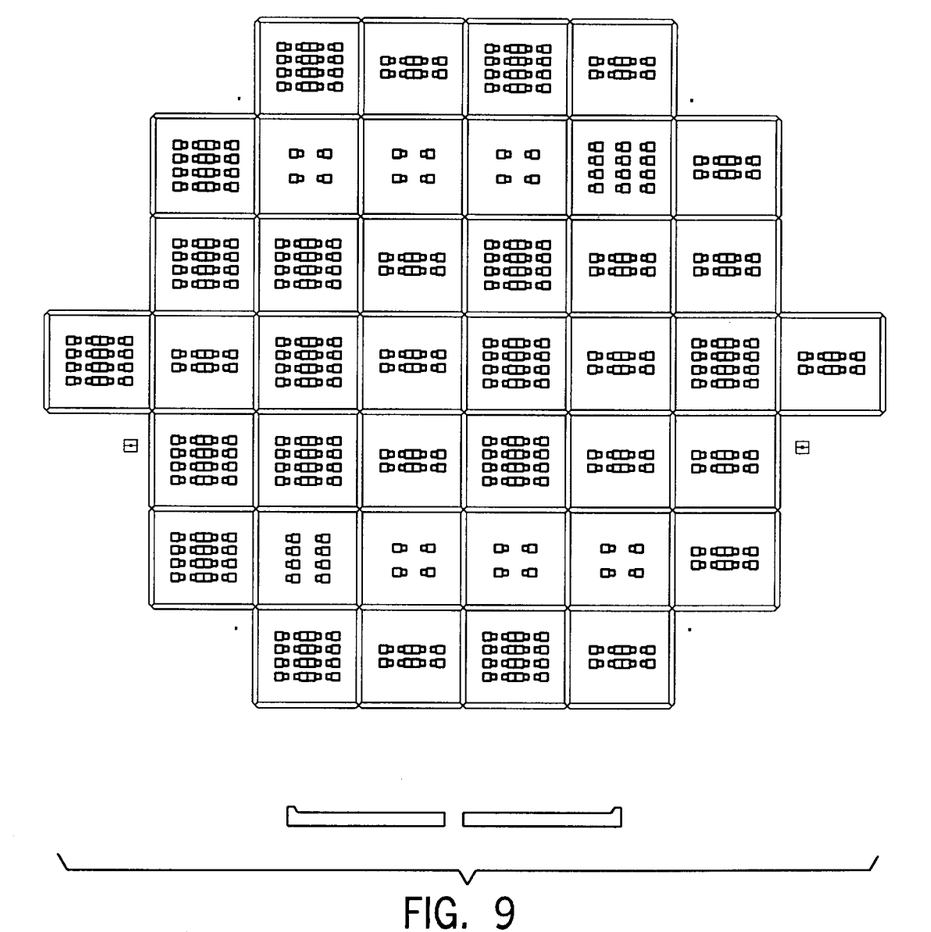
FIG. 9 represents a mask used for constructing the application of FIG. 2.

The housing 38 is fabricated in a similar fashion as the base layer 52, utilizing masks 6 and 7 (FIGS. 5 and 6). Mask 6 (FIG. 5) is used to form a recess 54 substantially surrounding the valve diaphragms 22 and 24. Mask 7 (FIG. 6) is used for etching the fluid conveying conduit 36. The oxide layer is not removed subsequent to KOH etching since it is needed for electrical isolation.

Figure 11A:
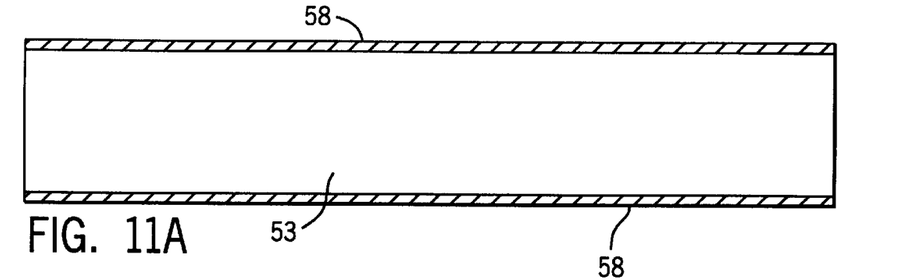
FIGS. 11A through 11H also illustrate construction of the application of FIG. 2.
Figure 11B:
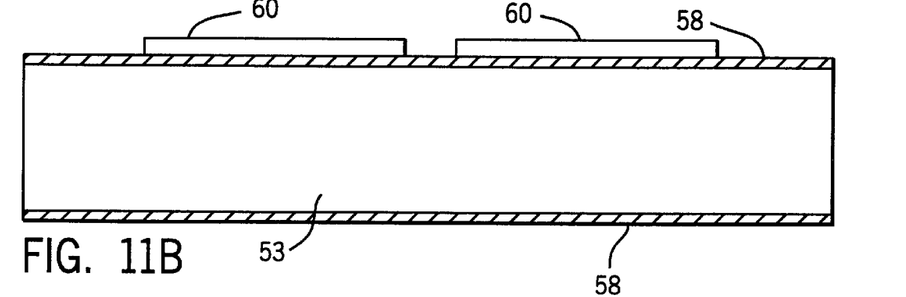
Figure 11C:
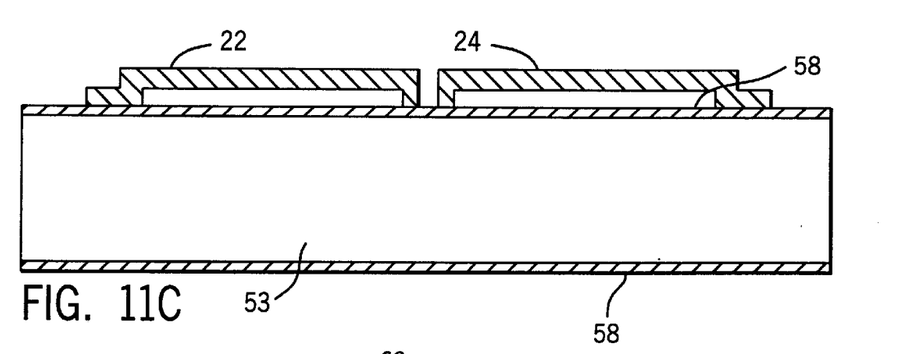
Figure 11D:
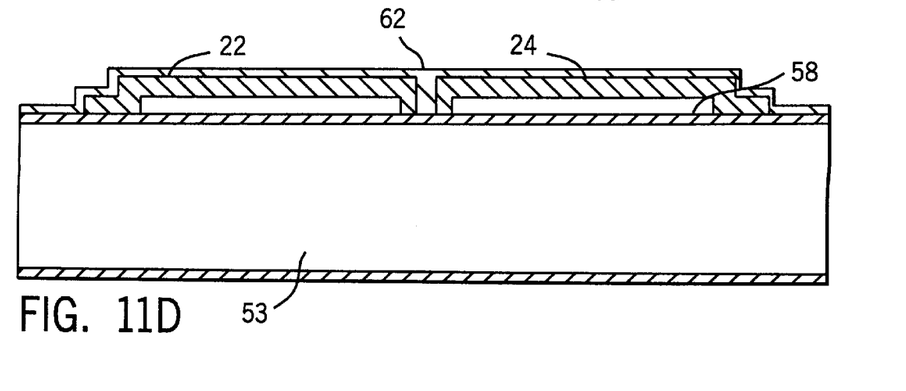
Figure 11E:
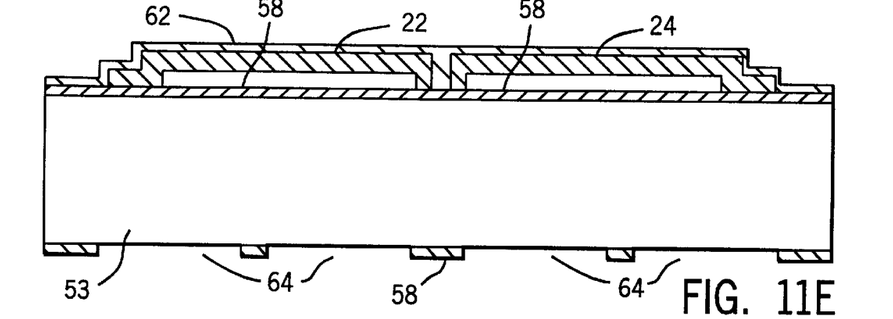
Figure 11F:
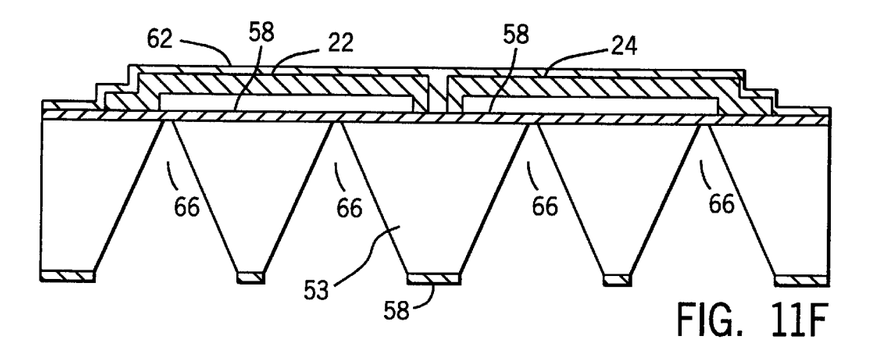
Figure 11G:
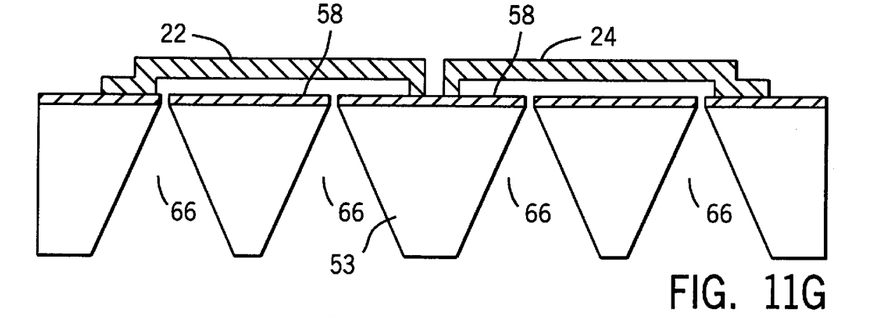
Figure 11H:
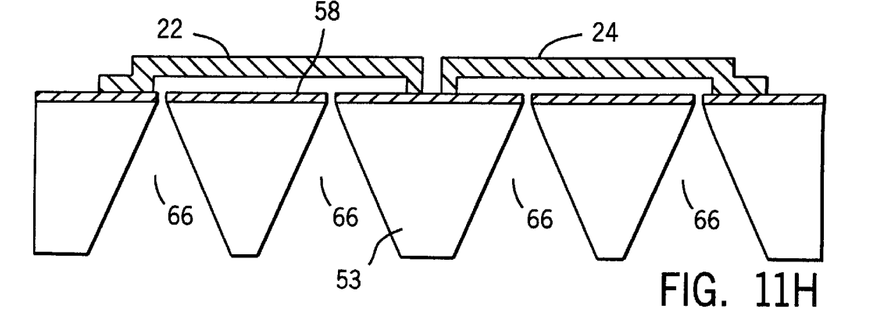

The fabrication of the layer forming the ground plane 40 is illustrated in FIGS. 11A through 11H from an about 400 $\mu$m double-sided polished <100> silicon wafer 53 with less than about 3 $\mu$m total thickness variation. An about 0.1 $\mu$m thick thermal oxide layer is grown on both sides of the layer forming the ground plane 40, after which the oxide layer on the top side is etched away in HF with the oxide layer on the bottom side being protected with photoresist (not shown). An about 0.1 $\mu$m silicon-rich silicon nitride layer 58 is deposited (FIG. 11A). An about 5 $\mu$m thick phosphosilicate glass (PSG) sacrificial layer 60 is deposited and patterned (mask 3, FIG. 7) as shown in FIG. 11B. Next, an about 4 $\mu$m thick polysilicon layer is deposited by low pressure chemical vapor deposition (LPCVD) and doped heavily with phosphorous to make it electrically conductive. The polysilicon on one side is removed and the polysilicon on the opposite side is patterned with mask 4 (FIG. 8) to form the first and second valve diaphragms 22 and 24, the electrical contact pads 44A and 44B (not shown), and electrical interconnections (not shown) between the first and second valve diaphragms 22 and 24 and their associated electrical contact pads 44A and 44B (FIG. 11C). An about 0.12 $\mu$m layer of stoichiometric silicon nitride 62 is deposited (FIG. 11D) by LPCVD to encapsulate the polysilicon structures. The oxide and nitride layer, which is a combination of the about 0.1 $\mu$m thick thermal oxide layer (not shown), the 0.12 $\mu$m stoichiometric nitride 62 and the 0.1 $\mu$m silicon rich nitride 58, on the bottom side is patterned (mask 5, FIG. 9) to open windows 64 for etching access holes from one side of the wafer 53 (FIG. 11E). A KOH etch is used to etch access holes 66 (FIG. 11F). The nitride, which is a combination of the 0.12 μm stoichiometric nitride 62 and 0.1 μm silicon rich nitride 58, on one side is then removed in plasma, which also removes the 0.1 μm silicon-rich nitride 58 on the opposite side in the access holes 66, as shown in FIG. 11G. The first and second valve diaphragms 22 and 24 are released in HF, which removes the PSG 60, as well as the stoichiometric nitride 62 on one side covering the polysilicon structures and the oxide layer (not shown) on the bottom side (FIG. 11H).

The bottom and middle wafers 52 and 40 are bonded, such as with a low-temperature process such as that based on sputtered low temperature melting glass on the surfaces to be bonded, a silicon fusion bonding technique, etc. Other suitable bonding methods which are appropriate to the smoothness of the wafers 52 and 40 may also be used. The housing 38 may be bonded with an adhesive or other applicable methods capable of functioning with the topography of the top side of wafer 40.

Further understanding of the embodiments described herein may be gained with a discussion of operation of one of the embodiments. This discussion is provided for illustrative purposes.

Figure 12A:
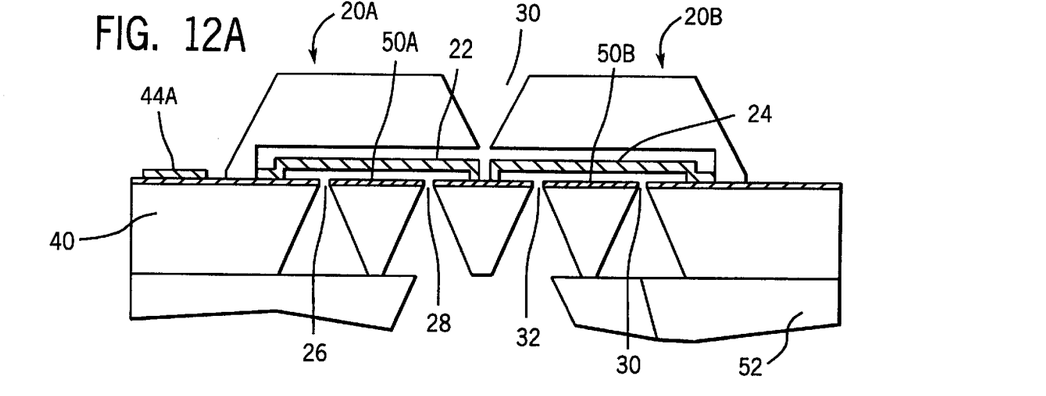
FIGS. 12A and 12B show the application of FIG. 2 in operation.
Figure 12B:
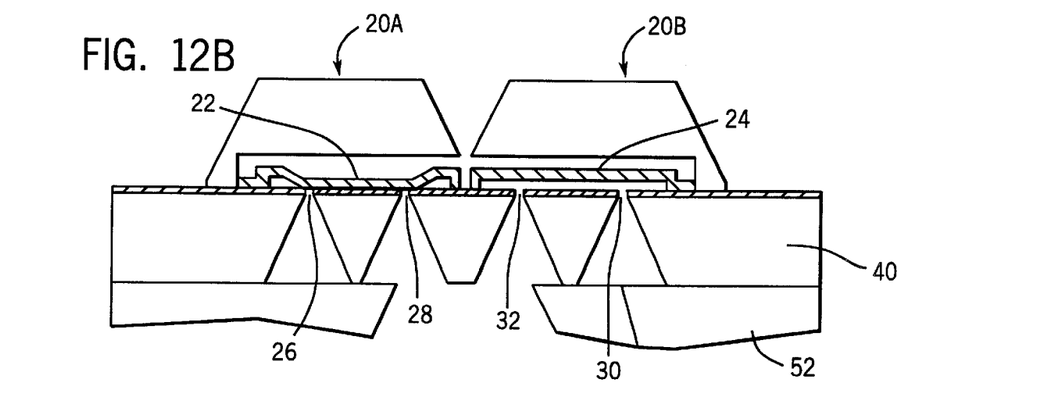

Operation of one embodiment described herein may be understood with reference to FIGS. 12A and 12B. For the sake of clarity of description, it is assumed that a starting configuration of the valve assembly 18 is in a first position, as shown in FIG. 12A, with both the first valve diaphragm 22 and the second valve diaphragm 24 in their first positions allowing fluid communication between the inlet ports 26 and 30, and the outlet ports 28 and 32, respectively.

A pneumatic pressure is sent from the first controller 14 through the fluid conveying conduit 36 into the recess 54. The pneumatic pressure flexes the valve diaphragms 22 and 24 toward their corresponding valve diaphragm engaging surfaces 50A and 50B (second positions). An electrical potential is sent from the second controller 16 to the piece 44A of electrically conductive material. The electrical potential moves from the piece 44A to the electrically associated first valve diaphragm 22. The pneumatic pressure from the first controller 14 is relieved, thereby allowing the second valve diaphragm 24 to flex away from the diaphragm engaging surface 50B toward its first position. However, the electrostatic force between the first valve diaphragm 22 and the ground plane 40 maintains the first valve diaphragm 22 in its second position adjacent the diaphragm engaging surface 50A, as shown in FIG. 12B.

The first valve diaphragm 22 is positioned adjacent to the diaphragm engaging surface 50A and is maintained in its second position by the electrostatic force between the first valve diaphragm 22 and the ground plane 40 until that electrostatic force is relieved. In a particular embodiment, the electrostatic force is generated by imposition of an electrical potential of about 65 volts (direct current) to the first valve diaphragm 22 while the ground plane 40 is electrically grounded. The electrical potential difference between the first valve diaphragm 22 and the ground plane 40, separated by the insulating layer 42 which serves as a dielectric, causes opposing charges to buildup on the first valve diaphragm 22 and the ground plane 40, creating an attractive electrostatic force between the two components sufficient to maintain the first valve diaphragm 22 in its second position adjacent to the valve diaphragm engaging surface 50A without application of a pneumatic pressure from the first controller 14. With the first valve diaphragm 22 in this second position, there is no fluid communication between the inlet port 26 and the outlet port 28. However, because the second valve diaphragm 24 has moved toward its first position, there is fluid communication between the inlet port 30 and the outlet port 32. In one embodiment, pressure in the inlet port 26 is no more than about 15 psig and not less than about 15 inches Hg vacuum to provide intended operation of the valve 20A.

The second valve diaphragm 24 is offset from the valve diaphragm engaging surface 50B when in its first position. When in the first position, there is fluid communication between the supply port 30 and the outlet port 32. In one embodiment, a pressure in the inlet port 30 is not more than about 15 psig and not less than about 15 inches Hg of vacuum, and the pressure present in the fluid conveying conduit 36 is about 20 inches Hg of vacuum. The increased pressure in the supply port 30 relative to the pressure in the fluid conveying conduit 36 maintains the second valve diaphragm 24 in its first position.

In the position illustrated in FIG. 12B, the pressure in the fluid conveying conduit 36 may be changed (for instance, to change the state of other devices 12 controlled by the same fluid conveying conduit 36). If the pressure in the fluid conveying conduit 36 is increased momentarily, e.g. to about 20 psig, then the second valve diaphragm 24 will momentarily move toward its second position, thereby interrupting fluid communication between the inlet port 30 and the outlet port 32. However, without an electrical potential being applied to the piece 44B of electrically conductive material, the second valve diaphragm 24 will return toward its first position when the pressure in the fluid conveying conduit 36 returns toward an "at rest" value, e.g. of about 20 inches Hg vacuum. Thus, the positions of the valves 20A and 20B may be maintained while the fluid conveying conduit 36 pressure changes to alter the state of other valves controlled by the same fluid conveying conduit 36.

The position of the valves 20A and 20B may be changed by manipulating the electrical potentials applied to the pieces 44A and 44B and/or the pressure in the fluid conveying conduit 36. In a particular embodiment, to change the position of the valve 20B, the pressure in the fluid conveying conduit 36 is increased to about 20 psig. The pressure in the fluid conveying conduit 36 is now higher than that in the inlet port 30, so the second valve diaphragm 24 moves toward its second position adjacent to the valve diaphragm engaging surface 50B. While the second valve diaphragm 24 is in the second position, an electrical potential of about 65 volts DC is applied to the piece 44B of electrically conductive material and to the second valve diaphragm 24, creating an attractive electrostatic force between the second valve diaphragm 24 and the ground plane 40.

The electrical potential previously applied to the first diaphragm 22 is removed, relieving the electrostatic force between the first valve diaphragm 22 and the ground plane 40. The pressure in the fluid conveying conduit 36 is then returned to a relatively reduced value, e.g. of about 20 inches Hg vacuum. The relatively higher pressure in the inlet port 26, compared to the pressure in the fluid conveying conduit 36 (cumulatively a third force), causes the first valve diaphragm 22 to move toward its first position, establishing fluid communication between the inlet port 26 and the outlet port 28. The electrostatic force on the second valve diaphragm 24 maintains the second valve diaphragm 24 in its second position, reducing fluid communication between the inlet port 30 and the outlet port 32.

If the pressure in the inlet port 26 is maintained, e.g. at about 15 inches Hg vacuum, and the pressure in the inlet port 30 is maintained, e.g. at about 15 psig, the operation described above may be used to change the pressure of the outlet conduit 34 from about 15 psig to about 15 inches Hg vacuum. A similar operation may be used to change the pressure of the outlet conduit 34 back to about 15 psig.

Figure 13:
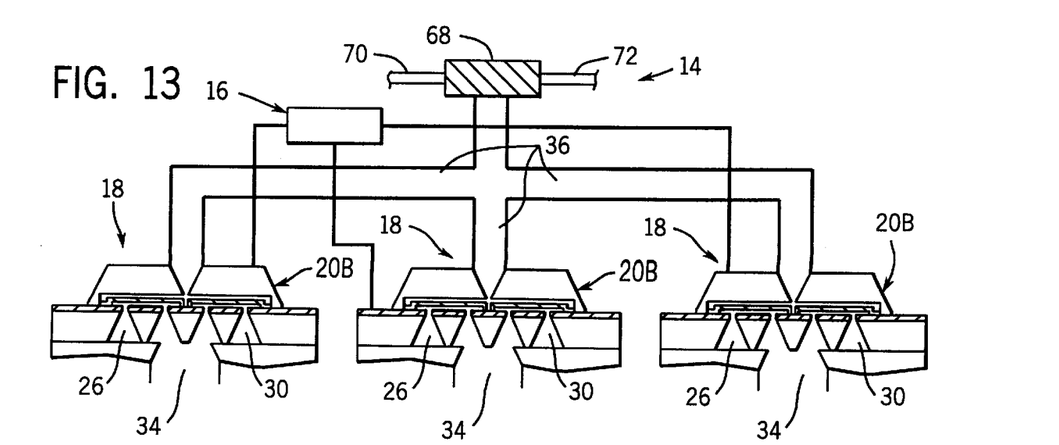
FIG. 13 shows a construction using the application of FIG. 2.

A similar change of pressure state may be effected for multiple valve devices, all controlled by a single fluid conveying conduit 36, by selectively maintaining or latching the desired valve positions by applying electrical potentials to the respective valve diaphragms 22 and 24. One example of such an arrangement of valves is illustrated in FIG. 13. Three valve assemblies 18, each comprising two valves 20A and 20B and each with independent electrical control of its associated valve diaphragms 22 and 24, are controlled pneumatically by a single 3-way solenoid valve 68 which directs either an about 20 psig pressure signal from conduit 70 or an about 20 inch Hg vacuum signal from conduit 72 to the single, branched fluid conveying conduit 36. The solenoid valve 68 and the conduits 70 and 72 act as the first controller 14. A source of electrical potential connected by suitable conductors to the pieces 44A and 44B of electrically conductive material for each valve assembly 18 comprise the second controller 16. Each of the valve assemblies 18 is connected to common supply conduits (not shown) that supply about 15 inches Hg vacuum to the three inlet ports 26 and about 15 psig pressure to the inlet ports 30. The combination of electrostatic and pneumatic control of the valve assemblies 18 yields three independently controllable output pressures present in the three outlet conduits 34.

In some constructions, the controller 16 may be used to maintain the valve diaphragms 22 and/or 24 in either the first or second positions or both. This may be done irrespective of pneumatic pressure present in the fluid conveying conduit 36, depending upon relative magnitudes of the electrostatic forces and pneumatic forces involved. In other constructions, the pneumatic force may be replaced by an electrostatic force or a thermal force acting through a bi-morph or shape memory alloy. In essence, instead of a pneumatic force being used to move the valve diaphragms 22 and/or 24 toward the first position from the second position, a sufficiently strong repulsive electrostatic or thermal force applied to the valve diaphragms 22 and/or 24, possibly combined with a sufficiently strong attractive electrostatic force between the housing 38 and the valve diaphragms 22 and/or 24, can be used to move the valve diaphragms 22 and/or 24 from the first position toward the second position. The opposite is also possible. In such instances, the second controller 16 may then be used to maintain the valve diaphragms 22 and/or 24 in either the first or the second positions or both irrespective of the relevant electrostatic or thermal state. In these constructions, the combination of first and second controllers 14 and 16 may provide increased speed of valve diaphragm 22 and 24 movement.

What is claimed is:

1. A method of controlling a first valve having a first flexible member and a second valve having a second flexible member, the method comprising the steps of:
    (a) operatively connecting a first controller with both the first flexible member and the second flexible member for moving both the first flexible member and the second flexible member between a first position where fluid communication is allowed and a second position where fluid communication is not allowed;
    (b) operatively connecting the first flexible member with a second controller for retaining the first flexible member in the second position independent of position of the second flexible member;
    (c) operatively connecting the second flexible member with the second controller for retaining the second flexible member in the second position independent of position of the first flexible member;
    (d) using the first controller to move the first flexible member and the second flexible member to the second position such that both the first flexible member and the second flexible member do not allow fluid communication;
    (e) using the second controller to retain the first flexible member in the second position; and
    (f) using the first controller to move the second flexible member to the first position such that the second flexible member allows fluid communication while the first flexible member does not allow fluid communication.

2. A method as defined in claim 1 wherein the first controller provides a pneumatic force.

3. A method as defined in claim 1 wherein the second controller provides an electrostatic force.

4. A method as defined in claim 1 wherein the first flexible member and the second flexible member are made of an electrically conductive material.

5. A method as defined in claim 4 wherein the second controller is a source of electrical potential electrically connected with at least one of the first flexible member and the second flexible member.

* * * * *